(12) United States Patent
Thrush et al.

(10) Patent No.: US 11,808,697 B2
(45) Date of Patent: Nov. 7, 2023

(54) PROTEIN QUANTITATION DEVICE

(71) Applicant: Bio-Rad Laboratories, Inc., Hercules, CA (US)

(72) Inventors: Evan Thrush, Hercules, CA (US); Steven Swihart, Walnut Creek, CA (US); William Strong, El Cerrito, CA (US); Trey Marlowe, San Francisco, CA (US); Li Lu, Livermore, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 0 days.

(21) Appl. No.: 17/877,680

(22) Filed: Jul. 29, 2022

(65) Prior Publication Data

US 2023/0026156 A1 Jan. 26, 2023

Related U.S. Application Data

(63) Continuation of application No. 17/199,312, filed on Mar. 11, 2021, now Pat. No. 11,435,285, which is a
(Continued)

(51) Int. Cl.
*G01N 21/31* (2006.01)
*G01N 21/3577* (2014.01)
*G01N 21/3563* (2014.01)

(52) U.S. Cl.
CPC ..... *G01N 21/3103* (2013.01); *G01N 21/3563* (2013.01); *G01N 21/3577* (2013.01);
(Continued)

(58) Field of Classification Search
CPC ........... G01N 21/3103; G01N 21/3563; G01N 21/3577; G01N 2021/3572;
(Continued)

(56) References Cited

U.S. PATENT DOCUMENTS 4,839,296 A * 6/1989 Kennedy ................ G01N 33/52
                                                      210/500.36
5,764,355 A    6/1998 Gagnon et al.
(Continued)

FOREIGN PATENT DOCUMENTS

CN    106687781 A    5/2017
EP      0709659 A2   5/1996
(Continued)

OTHER PUBLICATIONS

Strug et al. "Development of a Univariate Membrane-Based Mid-Infrared Method for Protein Quantitation and Total Lipid Content Analysis of Biological Samples." Journal of Analytical Methods in Chemistry, vol. 2014, Article ID 657079, Jul. 1, 2014.
(Continued)

*Primary Examiner* — David P Porta
*Assistant Examiner* — Gisselle M Gutierrez
(74) *Attorney, Agent, or Firm* — Kilpatrick Townsend and Stockton LLP

(57) ABSTRACT

Systems for protein quantitation using a Fabry-Perot interferometer. In one arrangement, a quantitation device includes an infrared source, a sample holder, and a Fabry-Perot interferometer positioned to receive infrared radiation from the source passing through a sample on the sample holder. A band pass optical filter sets the working range of the interferometer, and radiation exiting the interferometer falls on a detector that produces a signal indicating the intensity of the received radiation. A controller causes the interferometer to be tuned to a number of different resonance wavelengths and receives the intensity signals, for determination of an absorbance spectrum.

18 Claims, 10 Drawing Sheets

Related U.S. Application Data continuation of application No. 16/151,732, filed on Oct. 4, 2018, now Pat. No. 10,948,403.

(60) Provisional application No. 62/569,065, filed on Oct. 6, 2017.

(52) U.S. Cl.
CPC ............... *G01N 2021/3572* (2013.01); *G01N 2201/0686* (2013.01)

(58) Field of Classification Search
CPC ... G01N 2201/0686; G01N 2021/0339; G01N 2201/0438; G02B 5/281; G02B 26/001; G01J 3/10; G01J 3/42; G01J 3/26
See application file for complete search history.

(56) References Cited

U.S. PATENT DOCUMENTS

| | | | |
|---|---|---|---|
| 5,835,216 A | 11/1998 | Koskinen | |
| 6,665,076 B1 | 12/2003 | Watterson et al. | |
| 6,965,620 B2 | 11/2005 | Spiegelberg et al. | |
| 7,120,176 B2 | 10/2006 | McDonald et al. | |
| 9,018,584 B2 | 4/2015 | Chernokalskaya et al. | |
| 9,255,844 B2 | 2/2016 | Juuti et al. | |
| 9,581,499 B2 | 2/2017 | Saari et al. | |
| 9,772,228 B2 | 9/2017 | Antila et al. | |
| 9,857,223 B2 | 1/2018 | Zywicki et al. | |
| 10,101,210 B2 | 10/2018 | Pylkkanen | |
| 10,252,265 B2 * | 4/2019 | Tatnell | B01L 3/502715 |
| 10,451,480 B2 | 10/2019 | Smith | |
| 10,868,407 B2 | 12/2020 | Mathai et al. | |
| 10,948,403 B2 | 3/2021 | Thrush et al. | |
| 2002/0159055 A1 | 10/2002 | Bennett et al. | |
| 2003/0041649 A1 | 3/2003 | George et al. | |
| 2003/0215939 A1 | 11/2003 | Gaffney | |
| 2004/0133084 A1 | 7/2004 | Rule et al. | |
| 2006/0268258 A1 | 11/2006 | Braig | |
| 2008/0192246 A1 | 8/2008 | Neiss et al. | |
| 2010/0056652 A1 * | 3/2010 | Duong | B01D 71/32 521/53 |
| 2011/0164248 A1 | 7/2011 | Bushaw et al. | |
| 2012/0038928 A1 | 2/2012 | Saari et al. | |
| 2013/0062523 A1 | 3/2013 | Chernokalskaya et al. | |
| 2014/0071451 A1 | 3/2014 | Juuti et al. | |
| 2014/0340904 A1 | 11/2014 | Biermann et al. | |
| 2015/0300948 A1 | 10/2015 | Buchtal et al. | |
| 2016/0054179 A1 | 2/2016 | Carr | |
| 2017/0016829 A1 | 1/2017 | Swihart et al. | |
| 2017/0190836 A1 * | 7/2017 | Griffin | C08G 65/48 |
| 2017/0242149 A1 | 8/2017 | Fujisawa et al. | |

FOREIGN PATENT DOCUMENTS

| | | |
|---|---|---|
| EP | 2511692 A2 | 10/2012 |
| RU | 2612051 C1 | 3/2017 |
| WO | 2008/097262 A2 | 8/2008 |

OTHER PUBLICATIONS

International Search Report and Written Opinion in PCT Application PCT/US2018/054339 dated Jan. 22, 2019; 20 pages.

Partial Supplementary European Search Report in EP Application 18863962.9 dated May 10, 2021; 23 pages.

Neumann, N. et al.; "Novel MWIR microspectrometer based on a tunable detector"; Proceedings of SPIE; vol. 7208; Feb. 6, 2009; pp. 1-9.

Ebermann, M. et al.; "Tunable filter and detector technology for miniature infrared gas sensors"; 2017 ISOCS/IEEE International Symposium on Olfaction and Electronic Nose (ISOEN); IEEE; May 28, 2017; pp. 1-3.

Ebermann, M. et al.; "A fast MEMS infrared microspectrometer for the measurement of hydrocarbon gases"; 2015 Transducers—20157 18th International Conference on Solid-Sate Sensors, Actuators and Microsystems (Transducers); IEEE; Jun. 21, 2015; pp. 2037-2040.

\* cited by examiner

PROTEIN QUANTITATION DEVICE

CROSS-REFERENCE TO RELATED APPLICATIONS

This application is a continuation of U.S. patent application Ser. No. 17/199,312 filed Mar. 11, 2021, which is a continuation of U.S. patent application Ser. No. 16/151,732 filed Oct. 4, 2018, now U.S. Pat. No. 10,948,403, which claims the benefit of U.S. Provisional Patent Application No. 62/569,065 filed Oct. 6, 2017 and titled "Protein Quantitation Device", the entire disclosures of which are hereby incorporated by reference herein for all purposes.

BACKGROUND OF THE INVENTION

The measurement of the concentration or quantity of a protein or other analyte in a mixture is an integral part of much biochemical and biomedical research. For example, it may be desired to quantify the results of a protein purification procedure, or it may be desired to measure the amount of DNA or RNA in a mixture. Protein quantitation may also be used in disease diagnosis, and other applications.

Various techniques and devices have been developed to perform such quantitation studies. For example, the Bradford assay is a colorimetric assay in which Coomassie stain becomes blue in contact with proteins. The optical density (absorbance) of the mixture is measured with a spectrophotometer, and the result compared with a standard curve.

Other techniques exploit the fact that many analytes, including proteins, absorb light at specific wavelengths. For example, one technique is to illuminate a drop of the mixture, separate the light exiting the drop in to its spectral components, and measure the components with a series of detectors. The resulting spectrum can be examined to note the amount of light that was absorbed at wavelengths of interest.

Another technique often used to quantitate proteins and other analytes is Fourier transform infrared (FTIR) spectroscopy. In this technique, a sample is illuminated with broadband infrared light in a Michelson interferometer. As the interferometer is adjusted, certain wavelengths are filtered out by destructive interference within the interferometer. The resulting interferogram is processed using Fourier transform methods to extract the absorbance spectrum of the mixture.

Prior methods of quantitation have been time consuming, or involved bulky and expensive equipment.

BRIEF SUMMARY OF THE INVENTION

According to one aspect, a device for measuring absorption of light by a sample comprises a source of infrared radiation, a sample holder positioned to place a sample in a location to receive infrared radiation from the source, and a Fabry-Perot interferometer positioned to receive infrared radiation originating from the source and passing through the sample. The Fabry-Perot interferometer comprises a pair of spaced-apart reflective surfaces, at least one of which is movable to change the spacing between the reflective surfaces. The device further comprises a detector positioned to receive infrared radiation from the Fabry-Perot interferometer and to produce an output signal indicating the intensity of the infrared radiation received at the detector. The device further includes a band pass optical filter positioned in an optical path of the device such that infrared radiation from the source passes through the optical filter before reaching the detector. The device also includes a controller coupled to the source, the Fabry-Perot interferometer, and the detector. The controller includes a processor programmed to cause the Fabry-Perot interferometer to be tuned to a series of different resonant wavelengths, receive the output signal of the detector at each of the series of resonant wavelengths, and record an absorbance spectrum indicating the absorbance of the sample as a function of infrared radiation wavelength. In some embodiments, the source of infrared radiation is a micromachined resistive source. In some embodiments, the source of infrared radiation is hermetically sealed. In some embodiments, the Fabry-Perot interferometer is a micromachined Fabry-Perot interferometer. In some embodiments, the device further comprises an optical system positioned to direct infrared radiation passing through the sample toward an entrance aperture of the Fabry-Perot interferometer. In some embodiments, the detector is a pyroelectric detector. In some embodiments, the source is modulated at a predetermined measurement frequency. In some embodiments, the device further comprises a lock-in amplifier that receives the signal from the detector, enabling lock-in detection of the infrared radiation intensity. In some embodiments, the band pass optical filter is implemented using a coating on an optical element of the device. In some embodiments, the band pass optical filter is a first band pass optical filter and passes infrared radiation in a first wavelength band, and the device further comprises: a second band pass optical filter that passes infrared radiation in a second wavelength band different from the first wavelength band; and a mechanism for removing the first optical filter from the optical path and placing the second filter in the optical path such that infrared radiation from the source passes through the second optical filter before reaching the detector. In some embodiments, the series of wavelengths is a first series of wavelengths and the absorbance spectrum is a first absorbance spectrum, and the processor of the controller is further programmed to: cause the Fabry-Perot interferometer to be tuned to a second series of different resonant wavelengths with the second band pass optical filter in place in the optical path; receive the output signal of the detector at each of the second series of resonant wavelengths; and record a second absorbance spectrum indicating the absorbance of the sample as a function of infrared radiation wavelength within the range of wavelengths passed by the second band pass optical filter. In some embodiments, the processor of the controller is further programmed to combine the first and second absorbance spectra into a composite absorbance spectrum, covering a wider wavelength range than either the first or second absorbance spectrum alone. In some embodiments, the device further comprises a heater proximate the sample holder. In some embodiments, the device further comprises a source of moving air proximate the sample holder. In some embodiments, the device further comprises a mechanism for sequentially presenting samples for analysis by the device. In some embodiments, the device further comprises a dryer positioned to dry a sample while a previously-deposited sample is analyzed. In some embodiments, the mechanism for sequentially presenting samples for analysis by the device comprises a spool holding carrier material that is incrementally fed across the sample holder.

According to another aspect, a device for measuring absorption of infrared radiation by a sample comprises a source of infrared radiation, a sample holder positioned to place a sample in a location to receive infrared radiation from the source, and a first Fabry-Perot interferometer positioned to receive infrared radiation originating from the source and passing through the sample. The first Fabry-Perot interferometer comprises a pair of spaced-apart reflective surfaces, at least one of which is movable to change the spacing between the reflective surfaces. The device further comprises a first detector positioned to receive infrared radiation from the first Fabry-Perot interferometer and to produce an output signal indicating the intensity of the infrared radiation received at the first detector, and a first band pass optical filter positioned in an optical path of the device such that infrared radiation from the source passes through the first band pass optical filter before reaching the first detector, the first band pass optical filter passing a first band of infrared radiation wavelengths. The device further comprises a second Fabry-Perot interferometer positioned to receive infrared radiation originating from the source and passing through the sample, the second Fabry-Perot interferometer comprising a pair of spaced-apart reflective surfaces, at least one of which is movable to change the spacing between the reflective surfaces. The device further comprises a second detector positioned to receive infrared radiation from the second Fabry-Perot interferometer and to produce an output signal indicating the intensity of the infrared radiation received at the second detector, and a second band pass optical filter positioned in an optical path of the device such that infrared radiation from the source passes through the second band pass optical filter before reaching the second detector, the second band pass optical filter passing a second band of infrared radiation wavelengths different from the first. The device further comprises a controller coupled to the source, the first and second Fabry-Perot interferometers, and the first and second detectors, the controller including a processor programmed to cause each of the first and second Fabry-Perot interferometers to be tuned to a respective series of different resonant wavelengths, receive the output signals of the respective detectors at each of the series of resonant wavelengths, and record an absorbance spectrum indicating the absorbance of the sample as a function of infrared radiation wavelength within the range of wavelengths passed by the first and second band pass optical filters. In some embodiments, the device further comprises a beam splitter that directs a first portion of the infrared radiation passing through the sample to the first Fabry-Perot interferometer and passes a second portion of the infrared radiation passing through the sample to the second Fabry-Perot interferometer, such that both the first and second Fabry-Perot interferometers receive infrared radiation from the sample simultaneously. In some embodiments, the device further comprises an optical switch that directs infrared radiation passing through the sample to the first Fabry-Perot interferometer when the optical switch is in a first position and directs infrared radiation passing through the sample to the second Fabry-Perot interferometer when the optical switch is in a second position, such that at most one of the first and second Fabry-Perot interferometers receives infrared radiation from the sample at any one time. In some embodiments, the optical switch comprises a movable mirror. In some embodiments, the device further comprises a heater proximate the sample holder. In some embodiments, the device further comprises a source of moving air proximate the sample holder.

According to another aspect, a carrier for holding a sample for protein quantitation comprises a porous membrane having a number of sample loading areas designated thereon. The membrane defines a number of openings through the membrane, each of the sample loading areas being surrounded by openings such that each of the sample loading areas is defined on a portion of the membrane joined to the remainder of the membrane by bridges of the membrane material. In some embodiments, the membrane material is polyvinylidene difluoride (PVDF), polytetrafluoroethylene (PTFE), or nitrocellulose. In some embodiments, at least the sample areas of the carrier are impregnated with a surfactant.

According to another aspect, a carrier for holding a sample for analysis comprises a porous membrane having a number of sample loading areas designated thereon, and at least the sample areas are impregnated with a surfactant. In some embodiments, the membrane comprises polyvinylidene difluoride (PVDF), polytetrafluoroethylene (PTFE), or nitrocellulose. In some embodiments, the entire carrier is impregnated with the surfactant.

According to another aspect, a method of protein quantitation comprises directing infrared radiation to a sample from an infrared radiation source, at least some of the infrared radiation passing through the sample, and directing infrared radiation having passed through the sample to a band pass optical filter and to the input aperture of a Fabry-Perot interferometer. The method further comprises causing the Fabry-Perot interferometer to be tuned to a series of different resonant wavelengths, such that filtered infrared radiation emerges from the Fabry-Perot interferometer, wherein the filtered infrared radiation at each tuning includes primarily light in a narrow wavelength band, and directing the filtered infrared radiation to a detector. The detector produces an output indicating the intensity of the infrared radiation received at the detector. The method further comprises receiving the detector output, and recording an absorbance spectrum indicating the absorbance of the sample as a function of infrared radiation wavelength. In some embodiments, the band pass filter filters the infrared radiation before it enters the Fabry-Perot interferometer. In some embodiments, the band pass filter filters the infrared radiation after it emerges from the Fabry-Perot interferometer. In some embodiments, the method further comprises modulating the infrared radiation source at a modulation frequency, and passing the detector output through a lock-in amplifier operating at the modulation frequency. In some embodiments, the band pass filter is a first band pass filter and the absorbance spectrum is a first absorbance spectrum, and the method further comprises: replacing the first band pass filter with a second band pass filter, wherein the second band pass filter passes a different set of infrared radiation wavelengths than are passed by the first band pass filter; recording a second absorbance spectrum indicating the absorbance of the sample as a function of infrared radiation wavelength with the second band pass filter in place; and combining the first and second absorbance spectra into a composite absorbance spectrum. In some embodiments, the method further comprises sequentially presenting samples to a testing area for quantitation testing using a mechanism. In some embodiments, the method further comprises drying a sample while a previous sample is being tested.

DETAILED DESCRIPTION OF THE INVENTION

Figure 1:
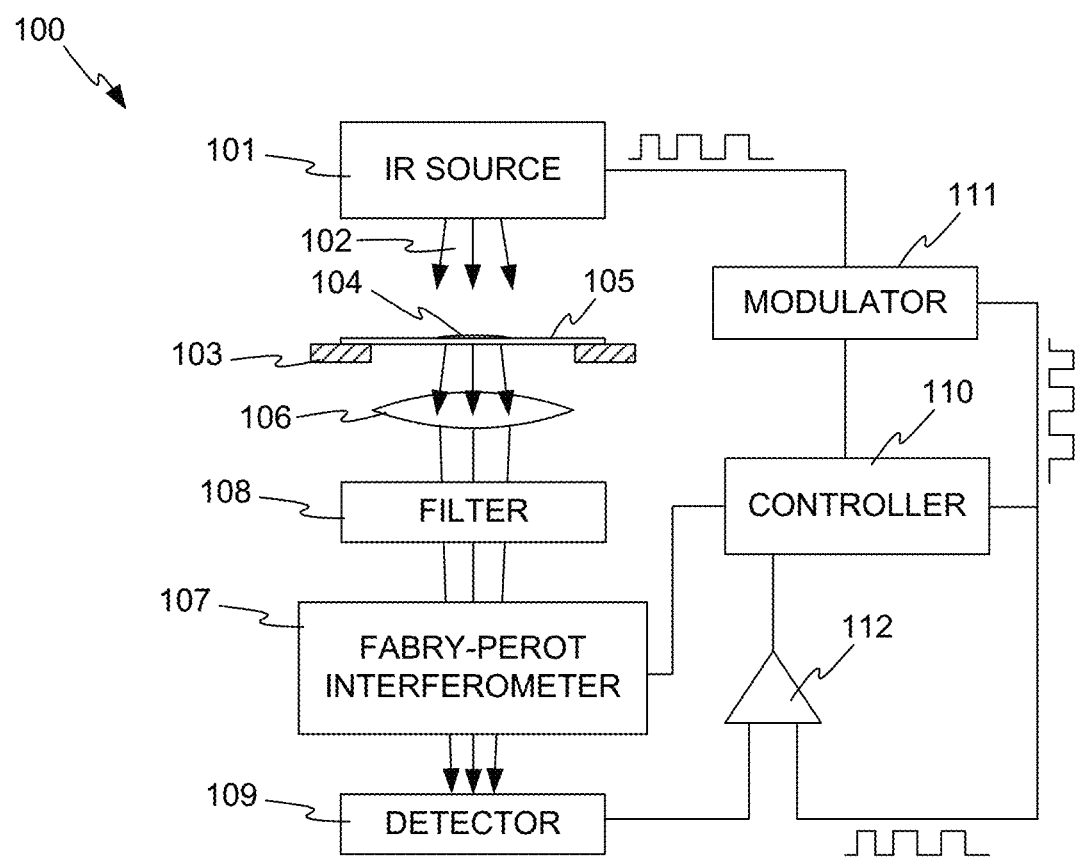
FIG. 1 illustrates a schematic block diagram of a quantitation device in accordance with embodiments of the invention.

FIG. 1 illustrates a schematic block diagram of a quantitation device 100 in accordance with embodiments of the invention.

Quantitation device 100 includes a source 101 of infrared (IR) light 102. Source 101 is preferably a substantially black body radiator controllable to a temperature that results in sufficient radiation output at wavelengths at or near the wavelengths of interest for quantitating the desired analytes. In some embodiments, source 101 may be a micromachined resistive source of the kind available from Axetris AG of Kaegiswil, Switzerland. In some embodiments, source 101 may be hermetically sealed. Some evidence suggests that a hermetically sealed source may be more stable than a source that is not hermetically sealed, resulting in better measurement stability. It is believed that the added stability is due to the protection of the source from air currents that might alter the temperature of the source, and therefore the power output of the source. Hermetically sealed IR sources are available from Micro-Hybrid Electronic GmbH, of Hermsdorf, Germany, and from Helioworks, Inc., of Santa Rosa, Calif., USA.

A sample holder 103 supports a sample 104, which may be disposed on a carrier 105. Sample holder 103 may be a slot, shelf, aperture, or other structure that can support carrier 105. While sample 104 is shown in FIG. 1 as having an appreciable thickness for clarity of illustration, an actual sample may be a very thin spot on a glass carrier, may be impregnated into a membrane, or may have another form. In any event, sample 104 and carrier 105 are preferably substantially transparent to IR light, except for the absorbing effect of the protein or other analyte in the sample.

Carrier 105 may be made of any suitable material, for example glass, silicon, germanium, or another material. In some embodiments, carrier 105 may be porous, such as a woven or nonwoven mesh made of polyvinylidene difluoride, (PVDF), polytetrafluoroethylene (PTFE), or another material. In some embodiments, carrier 105 may be coated with one or more surface treatments or impregnated and dried with one or more reagents (e.g. surfactants, detergents, polymers) to make some or all of the sample area hydrophobic or hydrophilic, or to impart other properties. For example, reagents may impart a shift in the absorbance spectra, cause an increase or decrease in a specific absorbance, or create a new absorbance not previously present in the sample absent the reagent.

A lens 106 or other optical system collects IR light that has passed through sample 104 and redirects it toward a Fabry-Perot interferometer 107. Preferably, a band pass filter 108 is placed in the optical path before the Fabry-Perot interferometer. Filter 108 is shown in FIG. 1 as being between lens 106 and Fabry-Perot interferometer 107, but it could also be placed differently, for example between source 101 and sample 104, or between carrier 105 and lens 106, or between interferometer 107 and a detector 109. The purpose of band pass filter 108 will be explained in more detail below.

While filter 108 is shown as a standalone element in the optical path, it could also be integrated into some other optical component. For example, filter 108 may be implemented as a coating on lens 106, or within Fabry-Perot interferometer 107, or on another optical element.

The operation of Fabry-Perot interferometer 107 is also explained in more detail below. Fabry-Perot interferometer 107 acts as a tunable sharp wavelength filter, preferentially passing a narrow band of wavelengths of the IR light entering it, and substantially blocking other wavelengths. The filtered light exiting Fabry-Perot interferometer 107 reaches detector 109, which produces an output signal indicating the intensity of the light reaching detector 109. Fabry-Perot interferometer may be, for example, a micromachined interferometer of the type available from InfraTec GmbH, of Dresden, Germany.

Preferably, detector 109 is placed at the focal point of lens 106.

While lens 106 is shown as a simple single-element lens placed before filter 108 in the optical path of the system, other arrangements are possible. Lens 106 represents any optical system that redirects light from sample 104 toward Fabry-Perot interferometer 107. The optical system may include one or more lens elements, reflectors, or other optical components, and may be place in any workable location in the optical path, for example after filter 108.

A controller 110 is coupled to IR source 101, Fabry-Perot interferometer 107, and detector 109, for controlling the operation of the system, storing measurement information, presenting results, and other functions. Controller 110 causes Fabry-Perot interferometer 107 to be tuned to a series of different resonant wavelengths, and measures the output of detector 109 at each wavelength. Using this data, controller 110 can construct an absorbance spectrum of the sample. For the purposes of this disclosure, the terms "absorbance spectrum" and "absorption spectrum" are used interchangeably. This spectrum can be used to quantify the amount of analyte in the sample. Typically, the absorption spectrum is analyzed to estimate the size of any absorption feature of interest that is associated with the material being quantified. The absorption feature manifests itself as a loss in power when compared to a measurement of a sample without the material of interest. Typically, a reference scan is done on the sample substrate without the material of interest so this can be directly compared to measurements done with the material of interest. In one embodiment, the measurement of the material of interest is divided by the reference measurement, which will give the fraction of light loss due to the material of interest. Another way to explain the ratio would be the transmittance through the material of interest. By taking the measurement at many wavelengths around the absorption feature of interest, a transmittance spectra can be plotted which shows a dip around any absorption features. The magnitude of the absorption feature can be calculated from the plot by various means, such as looking at areas of the curve with no absorption feature and estimating the height of the absorption feature relative to areas with no absorption.

In some embodiments, detector 109 may be a pyroelectric detector. A pyroelectric detector includes a material that generates an electric voltage as the material is heated or cooled—a phenomenon called the pyroelectric effect. Suitable pyroelectric detectors are also available from InfraTec GmbH.

Because the pyroelectric effect requires the detecting material to be heated and cooled, source 101 may be pulsed or modulated as shown at 111 if a pyroelectric detector is used. In some embodiments, source 101 may be modulated at about 10 Hz. Because source 101 is micromachined, its components are very small and are able to heat and cool very rapidly, enabling the modulation of source 101.

The modulation of source 101 has the additional benefit that lock-in detection may be used to read the outputs of detector 109. Lock-in detection is a technique for greatly reducing the effect of noise by multiplying a signal to be measured by a reference signal of the same frequency, and integrating the result. Components of the signal to be measured that are not at the measurement and reference frequency are greatly attenuated, enabling extraction of measurement data from extremely noisy signals. A lock-in amplifier 112 may be placed, for example, in controller 110 or another location in the system. Modulation, lock-in detection, or both may be used in any embodiment described herein.

In addition to the performance benefits resulting from modulation, which is enabled by the small size of a micromachined source, the use of a micromachined source 101 and a micromachined interferometer 107 means that quantitation device 100 can be made very compact as compared with prior devices, and at dramatically lower cost.

The use of a Fabry-Perot interferometer for protein quantitation is a somewhat surprising discovery, as this kind of interferometer is known to have a narrower wavelength measurement range than, for example, a Michelson interferometer. The narrowness of the measurement range can be understood as follows.

Figure 2:
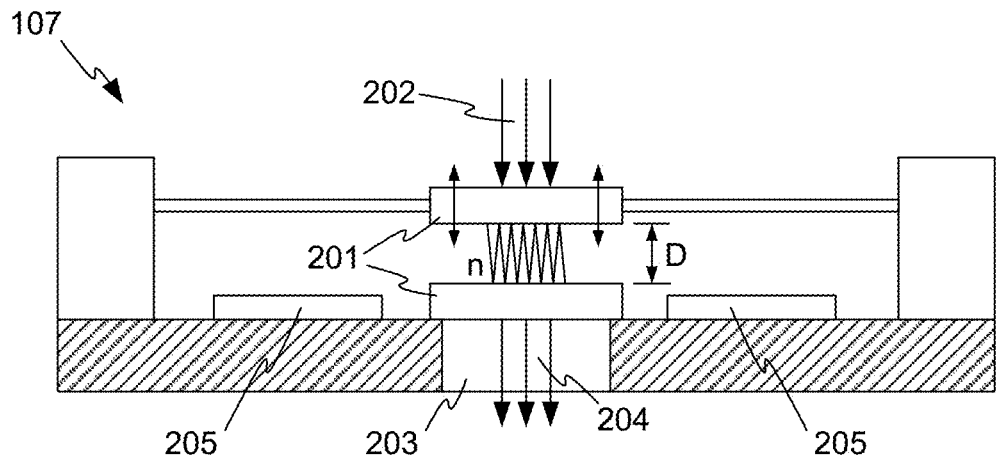
FIG. 2 illustrates a schematic diagram of the operation of a Fabry-Perot interferometer.

FIG. 2 shows a schematic diagram of the operation of Fabry-Perot interferometer 107. Fabry-Perot interferometer 107 includes two flat partially transmitting mirrors 201, spaced apart by a distance D, and having a reflectance R. Entering light 202 reaches the gap between mirrors 201 and undergoes multiple reflections between mirrors 201 before exiting through an exit aperture 203 of interferometer 107. Light having a wavelength of twice the spacing D or any submultiple thereof (D, D/2, D/3, etc.) "resonates" within the gap, and undergoes constructive interference. Light of other wavelengths undergoes some level of destructive interference. The net effect is that interferometer 107 is a sharp wavelength filter, passing light having a resonant wavelength much more readily than light of other wavelengths. Exiting light 204 is therefore composed predominantly of the resonant wavelengths.

Distance D is adjustable under the control of controller 110, through control electrodes 205.

The filter characteristic of interferometer 107 is described by the Airy formula:

$$T = \left(1 - \frac{A}{(1-R)}\right)^2 \frac{1}{1 + \frac{4R}{(1-R)^2}\sin^2\left(2\pi n D \frac{1}{\lambda}\cos\beta - \varphi\right)}$$

where:
T is the transmittance of the filter as a function of wavelength;
n is the refractive index of the gap material (~1.0 for air);
D is the gap width;
β is the angle of incidence;
R is the mirror reflectance;
A is the mirror absorptance; and
φ is the phase at reflection (See Ebermann, Martin, et al. "Design, Operation and Performance of a Fabry-Perot-Based MWIR Microspectrometer," Sensor+ Test Conference. Vol. 2009. 2009.)

Figure 3:
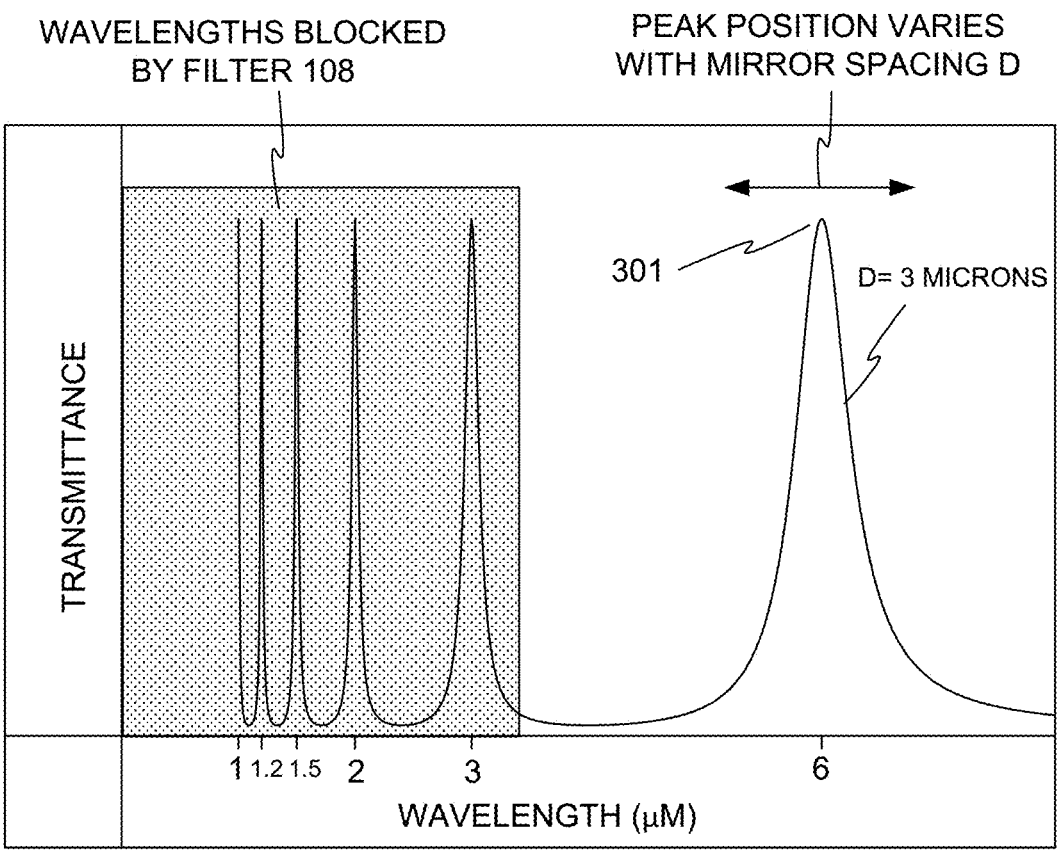
FIG. 3 illustrates the relative transmittance of the interferometer of FIG. 2 as a function of wavelength for a gap width of 3 microns.

FIG. 3 illustrates the relative transmittance of interferometer 107 as a function of wavelength for a gap width D of 3 microns (with n=1, β=0, R=0.75, A=0.02, and φ=0). As is apparent, the transmittance exhibits sharp peaks at 6 microns and submultiples thereof—that is at 3, 2, 1.5, 1.2, and 1 microns. Interferometer 107 thus acts as a sharp wavelength filter, passing wavelengths near the peaks and substantially blocking other wavelengths.

If no other filtering were done, the detector 109 would receive light at all of the peak wavelengths, and it would not be possible to determine an accurate absorbance spectrum for sample 104 based on the output of detector 109 because each reading would include signal resulting from multiple wavelength bands. However, filter 108 may be configured to block the shorter peak wavelengths, as shown by the (idealized) shaded area of FIG. 3, leaving only the rightmost peak to be passed. For example, filter 108 may be dichroic filter with a cutoff wavelength of just over 3 microns (in this example), so that wavelengths longer than the cutoff are passed while wavelengths shorter than the cutoff are blocked. The position of rightmost peak 301 varies with the gap width D.

Figure 4:
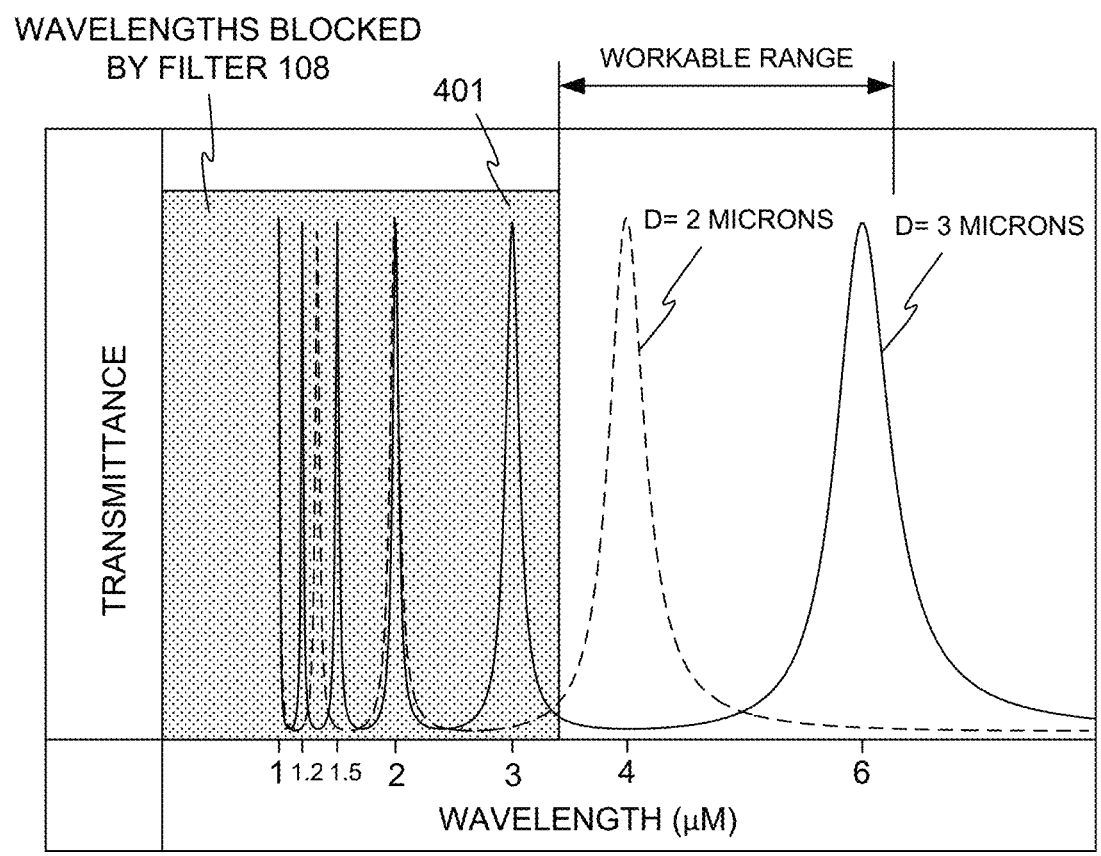
FIG. 4 shows the curve of FIG. 3 with an additional filter curve taken with a gap width of 2 microns.

For example, FIG. 4 shows the curve of FIG. 3 with an additional filter curve taken with a gap width D of 2 microns, and shown in dashed lines. In the dashed curve, the rightmost peak has shifted to the left (to a shorter wavelength). That is, interferometer 107 has been tuned to a resonant wavelength of 4 microns. As can be seen, interferometer 107 has a limited workable range of wavelengths for detecting an absorbance spectrum. If the mirror spacing D is made too small, the rightmost peak will be shifted to a wavelength short enough to be blocked by filter 108. If the mirror spacing D is made too large, then secondary peak 401 will move to the right and fall outside the filtration band of filter 108. In that case, detector 109 would receive light from both of the first two peaks, and it would be impossible to determine the absorbance at a single specific wavelength. The workable range extends roughly from the cutoff wavelength of filter 108 to double the cutoff wavelength. The workable range is also sometimes called the free spectral range.

This limitation on the workable wavelength range of a Fabry-Perot interferometer would seem to weigh against the use of a Fabry-Perot interferometer for quantitation of proteins and other analytes, because different analytes may absorb at different wavelengths which may be widely different from each other.

However, embodiments of the invention enable use of a Fabry-Perot interferometer for quantitation.

In one embodiment, the cutoff wavelength of filter 108 is chosen so that the workable range of interferometer 107 encompasses the absorbance wavelengths of one or more analytes of interest. For example, many proteins absorb at wavelengths corresponding to bending and stretching vibrations in certain chemical bonds in the proteins. Two bands of particular interest are the "Amide I" and "Amide II" bands. The Amide I band results primarily from stretching vibrations in C=O and C—N bonds, and falls between about 5.88-6.25 microns (wave number 1600-1700 cm$^{-1}$). The Amide II band results primarily from bending vibrations in N—H bonds, and falls between about 6.33-6.62 microns (wave number 1510-1580 cm$^{-1}$).

By properly selecting the cutoff wavelength of filter 108, the workable range of interferometer 107 can be made to encompass both the Amide I and Amide II bands, making quantitation device 100 useful for many protein quantitation experiments. For example, a cutoff wavelength between about 3.5 and 5 microns may be used. In one preferred embodiment particularly suitable for protein quantitation, filter 108 has a cutoff wavelength of just over 4.0 microns, giving the device a working wavelength range of about 5 to 8 microns.

Similarly, DNA and RNA are known to absorb at specific IR wavelengths, for example at about 8 microns.

Figure 5:
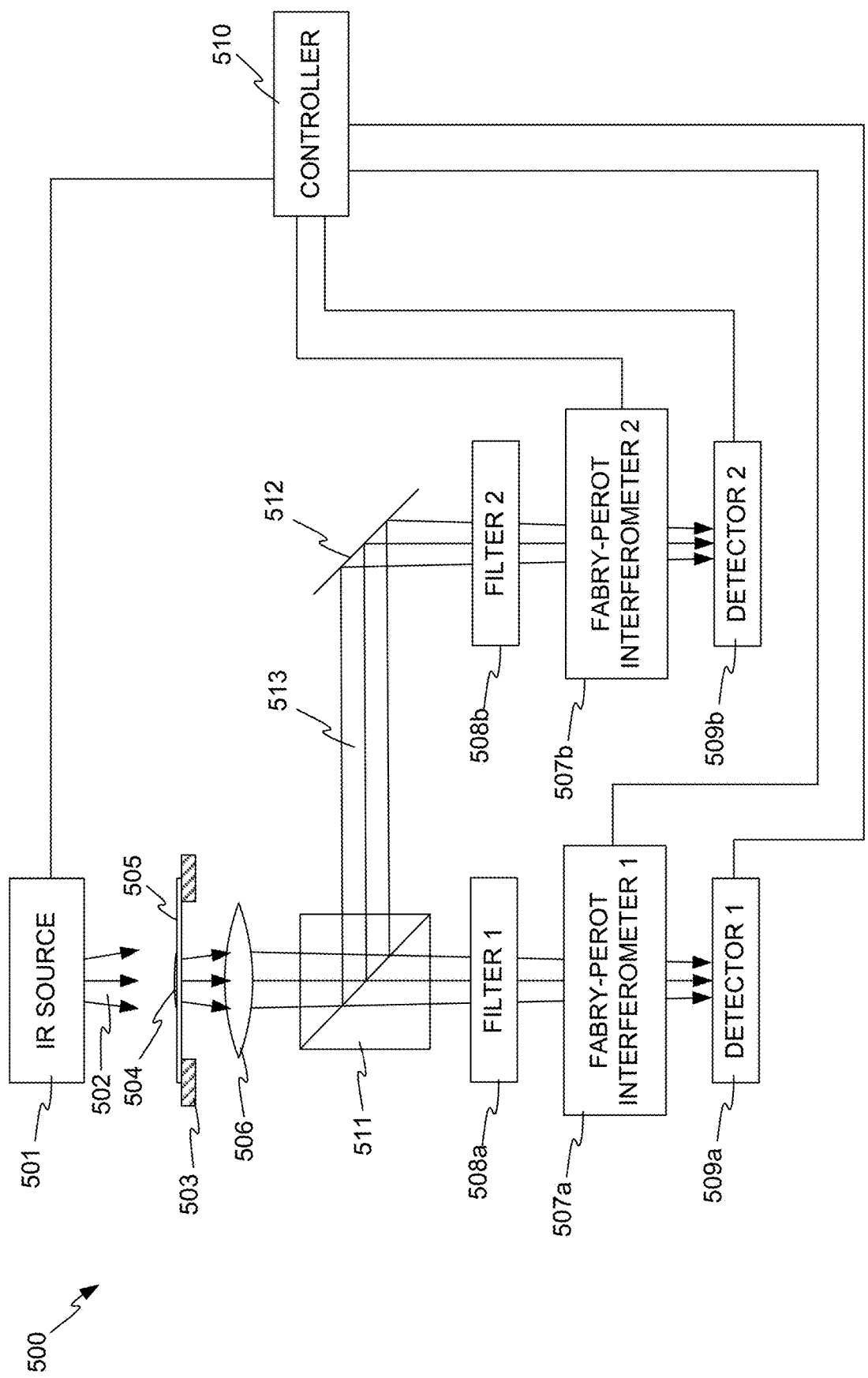
FIG. 5 shows a schematic diagram of a quantitation device in accordance with other embodiments of the invention.

FIG. 5 shows a schematic diagram of a quantitation device 500 in accordance with other embodiments of the invention. Example quantitation device 500 can have an extended measurement range as compared with device 100 discussed above. This is accomplished by including two Fabry-Perot interferometers with different measurement ranges within the same device 500.

In example quantitation device 500, a source 501 produces IR light 502 to illuminate a sample 504. Source 501 may be similar to source 101 discussed above, and is preferably a substantially black body radiator controllable to a temperature that results in sufficient radiation output at wavelengths at or near the wavelengths of interest for quantitating the desired analytes.

A sample holder 503 supports the sample 504, which may be disposed on a carrier 505. While sample 504 is shown in FIG. 5 as having an appreciable thickness for clarity of illustration, an actual sample may be a very thin spot on a glass carrier, may be impregnated into a membrane, or may have another form. In any event, sample 504 and carrier 505 are preferably substantially transparent to IR light, except for the absorbing effect of the protein or other analyte in the sample.

A lens 506 or other optical system collects IR light that has passed through sample 504 and redirects it toward a beam splitter 511. Beam splitter 511 may include, for example, a partially silvered mirror that divides the light coming from lens 506 and directs the divided portions in different directions. In FIG. 5, one portion (for example 50% or another portion) of the light is directed to Fabry-Perot interferometer 507a. Another portion of the light is directed to a second Fabry-Perot interferometer 507b. Other optical elements may be present for facilitating the direction of light to the two interferometers, for example mirrors such as mirror 512, collimators, and the like. In other embodiments, the multiple interferometers may be spatially arranged to simplify the optical arrangements. For example, second interferometer 507b could be placed with its axis parallel to beam 513, so that mirror 512 would not be needed.

While beam splitter 511 is shown as being placed after lens 506 in the optical path, it may also be placed before lens 506. In some embodiments, lens 506 provides collimation of the light, to help avoid degradation of the intensity of the light as it travels to the two interferometers, which may be different optical distances from sample 504. In other embodiments, the system may be constructed so that the path lengths from sample 504 to the two interferometers are the same. Collimation may be used in any event.

A first filter 508a is placed in the optical path before first interferometer 507a. Filter 508a is a band pass filter, having a first cutoff wavelength, setting the working wavelength range of first interferometer 507a. By way only of example, first filter 508a may have a cutoff wavelength of about 3 microns, blocking all wavelengths shorter than 3 microns and passing all wavelengths longer than 3 microns, so that the working wavelength range of interferometer 507a is about 3 to 6 microns.

A second filter 508b is placed in the optical path before second interferometer 507b. Filter 508b is also a band pass filter having a different cutoff wavelength than first filter 508a. By way only of example, second filter 508b may have a cutoff wavelength of about 5 microns, blocking all wavelengths shorter than 5 microns and passing all wavelengths longer than 5 microns, so that the working wavelength range of interferometer 507b is about 5 to 10 microns.

Detectors 509a and 509b receive the light passed by interferometers 507a and 507b respectively, and produce signals indicating the intensity of the light received by detectors 509a and 509b. A controller 510 is coupled to source 501, interferometers 507a and 507b, and detectors 509a and 509b, and is configured to control the operation of the system and to receive signals from detectors 509a and 509b.

In this arrangement, interferometers 507a and 507b can essentially be operated in parallel, to test the same sample 504 across two wavelength bands. The workable wavelength range of quantitation device 500 spans the combined ranges of interferometers 507a and 507b, enabling testing of a wider variety of analytes as compared with quantitation device 100. In the above example, the wavelength ranges of interferometers 507a and 507b overlap, and combine for a working wavelength range of about 3 to 10 microns. In other embodiments, different ranges may be selected. The ranges of the multiple interferometers may overlap, may abut, or may be separated by gaps so that absorption data is not gathered for some wavelengths. Controller 510 reads the outputs of detectors 509a and 509b as interferometers 507a and 507b are moved across their desired ranges, and then combines the readings into a composite absorption spectrum. Interferometers 507a and 507b may be operated and sensed one at a time in sequence, or may be operated and sensed in parallel, with controller 510 reading the outputs of detectors 509a and 509b alternately or in another interleaved pattern.

In one embodiment, the wavelength ranges of the two interferometers may be selected so that device 500 can detect proteins in wavelengths of about 5.8-6.3 microns with one of the interferometers and lipids in wavelengths of about 3.3-3.6 microns with the other interferometer.

In other embodiments, more than two interferometers may be provided, each in conjunction with a band pass filter having a different cutoff wavelength, further extending the workable range of the overall instrument. The workable wavelength ranges of the interferometers in a multiple-interferometer instrument may overlap, may abut, or may be separated by gaps in which certain wavelengths are not sensed.

The arrangement of FIG. 5 has the advantage that interferometers 507a and 507b can be operated in parallel, enabling measurement over a wide range of wavelengths in a way that may appear nearly simultaneous. However, this arrangement may have the disadvantage that the light intensity reaching at least one of the interferometers is half or less the intensity that would be present if beam splitter 511 were not present, resulting in less measurement signal and possibly a worse signal-to-noise ratio in the outputs of detectors 509a and 509b. If the light is divided among more than two interferometers, then the intensity would be further reduced.

Figure 6:
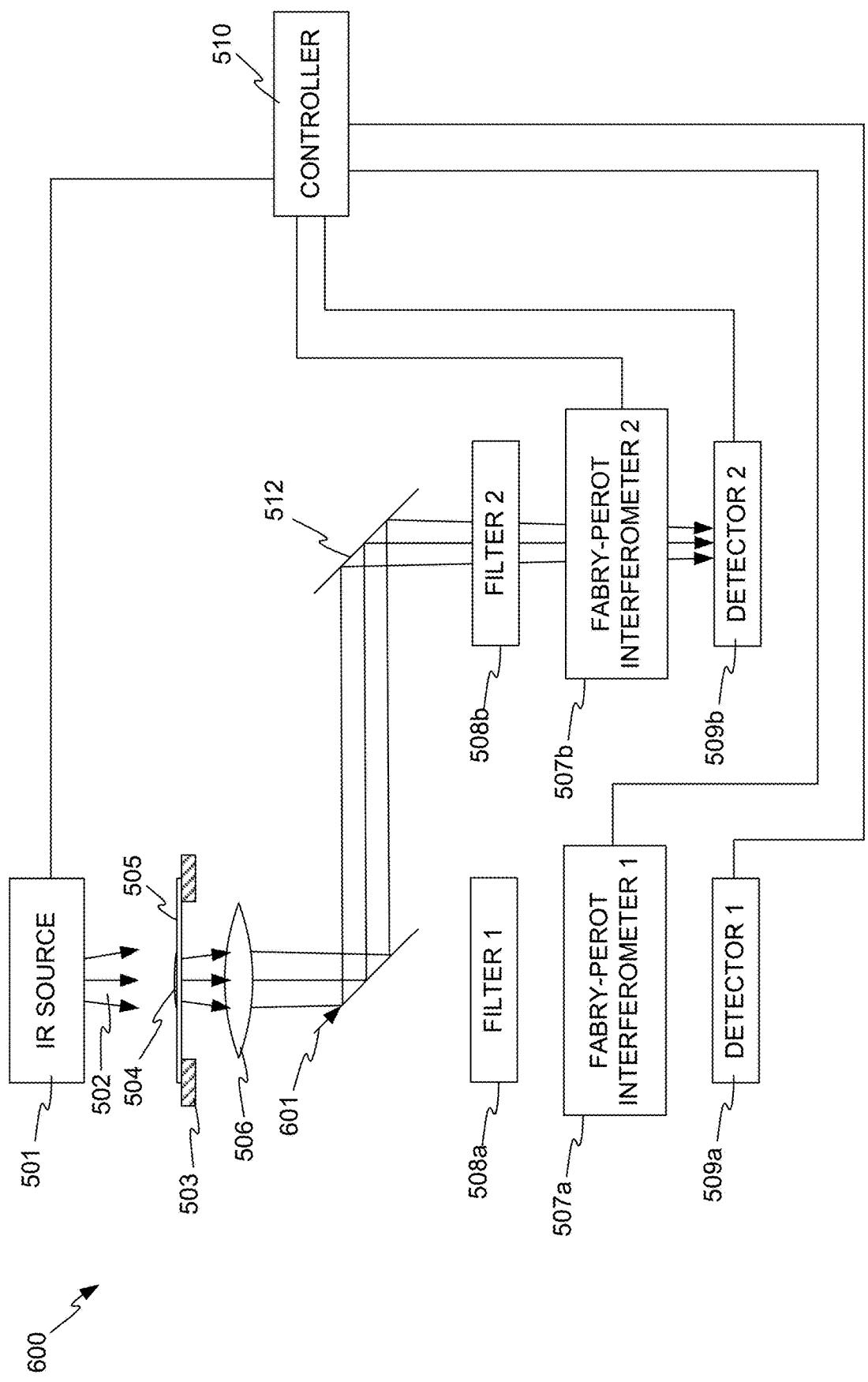
FIG. 6 illustrates a quantitation device in accordance with other embodiments of the invention.
Figure 7:
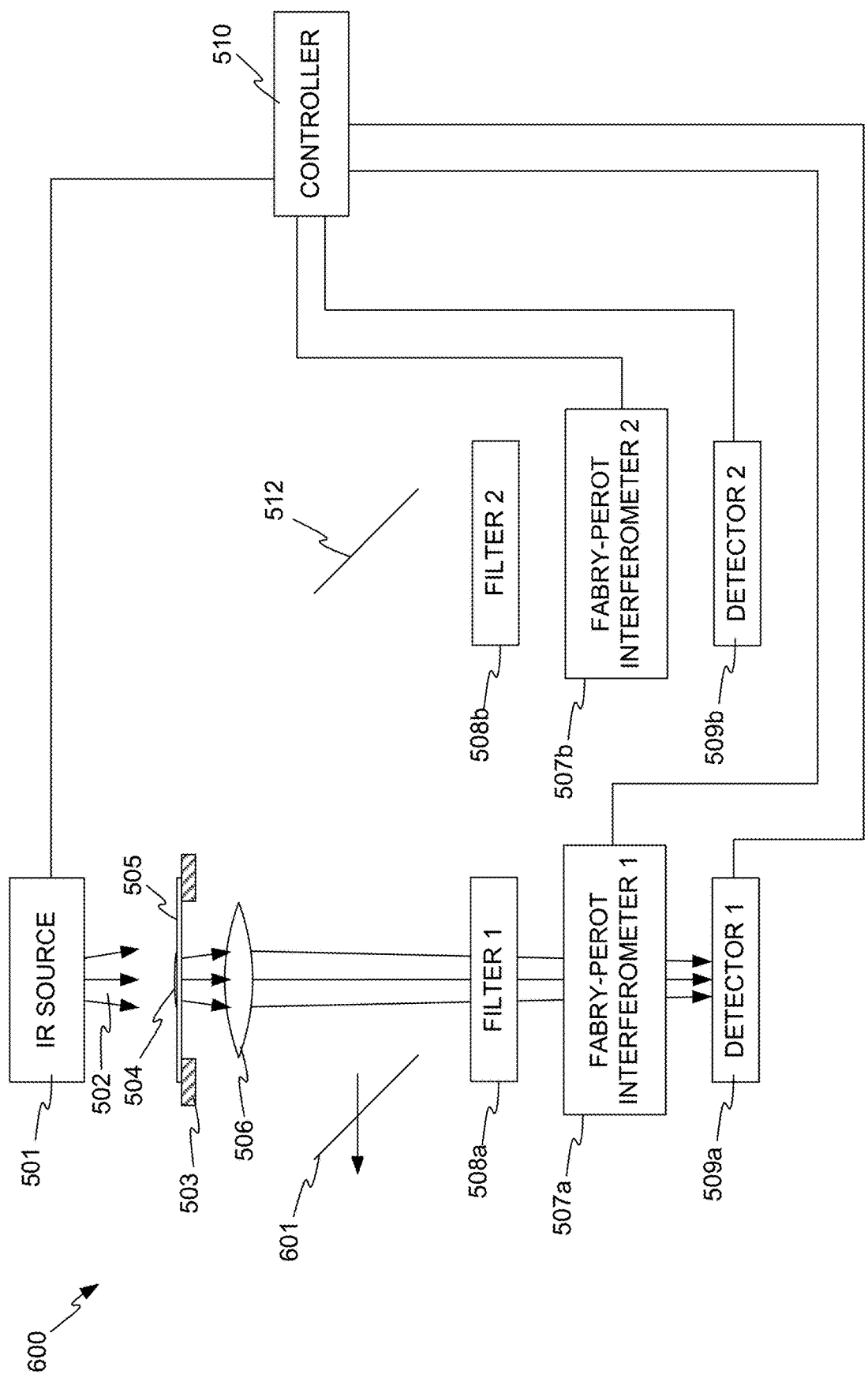
FIG. 7 illustrates the quantitation device of FIG. 6 with a mirror removed from the optical path.

FIG. 6 illustrates a quantitation device 600 in accordance with other embodiments of the invention. In device 600, a movable mirror 601 is used instead of beam splitter 511. Movable mirror 601 is an example of an optical switch. The other components in FIG. 6 are similar to those in FIG. 5, and are given the same reference numerals. When mirror 601 is in place as shown, substantially all light from lens 506 is directed to interferometer 507b. FIG. 7 shows quantitation device 600 with mirror 601 removed from the optical path, so that the light from lens 506 is directed to interferometer 507a. In device 600, interferometers 507a and 507b are preferably used one at a time. That is, one of the interferometers is used to completely measure its wavelength range, mirror 601 is moved, and then the other interferometer is used to measure its wavelength range. While the measurements are sequential, the full intensity of light coming from lens 506 is available for both measurements.

In FIG. 7, mirror 601 is shown as having been translated out of the optical path. In other embodiments, a rotational motion may be used, or a combination of rotation and translation. In other embodiments, mirror 601 may be an electronically controllable reflector, and may be made reflective or transmissive as needed rather than being moved. Other methods of switching light from one interferometer to another may be envisioned and used as well. More than two interferometers may be used, in conjunction with other optical arrangements that switch the light among any workable number of interferometers.

Figure 8:
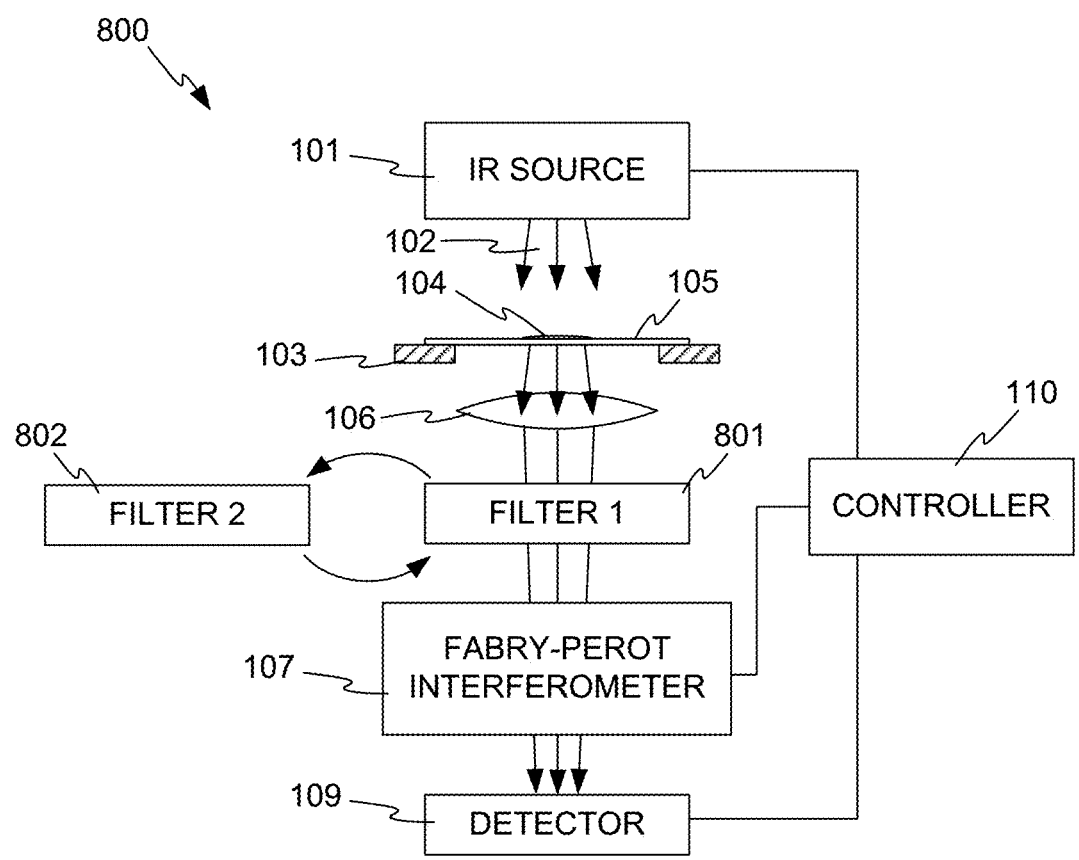
FIG. 8 illustrates a block diagram of a quantitation device in accordance with another embodiment.

FIG. 8 illustrates a block diagram of a quantitation device 800 in accordance with another embodiment. Example quantitation device 800 is similar in many respects to quantitation device 100 shown in FIG. 1, and similar elements are given the same reference numerals. However, rather than a single filter, quantitation device 800 includes two interchangeable filters 801 and 802, having different cutoff wavelengths. Because the workable or free spectral range of Fabry-Perot interferometer 107 is fundamentally determined by the cutoff wavelength of the filter used with it, the workable or free spectral range of device 800 can be modified by swapping filters 801 and 802. When filter 801 is placed in the optical path, the workable range is determined by the cutoff wavelength of filter 801. When filter 802 is placed in the optical path, the workable range is determined by the cutoff wavelength of filter 802. By switching filters 801 and 802 into the optical path at different times, the working range of device 800 can be the combined working ranges determined by the two filters. This is in much the same way that the working range of device 600 described above includes the ranges of two interferometers used one at a time, except that device 800 accomplishes the range extension using only one interferometer. Presuming that a suitable interferometer is used, for example with sufficient mirror travel, device 800 has the advantage that the cost of a second interferometer may be saved. As in other embodiments, the ranges determined by filters 801 and 802 may overlap, may abut, or may be separated so that some wavelengths are not covered in the composite working range. More than two filters may be provided.

According to another aspect, a sample carrier such as carrier 105 may be formed in such a way as to facilitate loading of samples into the quantitation device.

Figure 9:
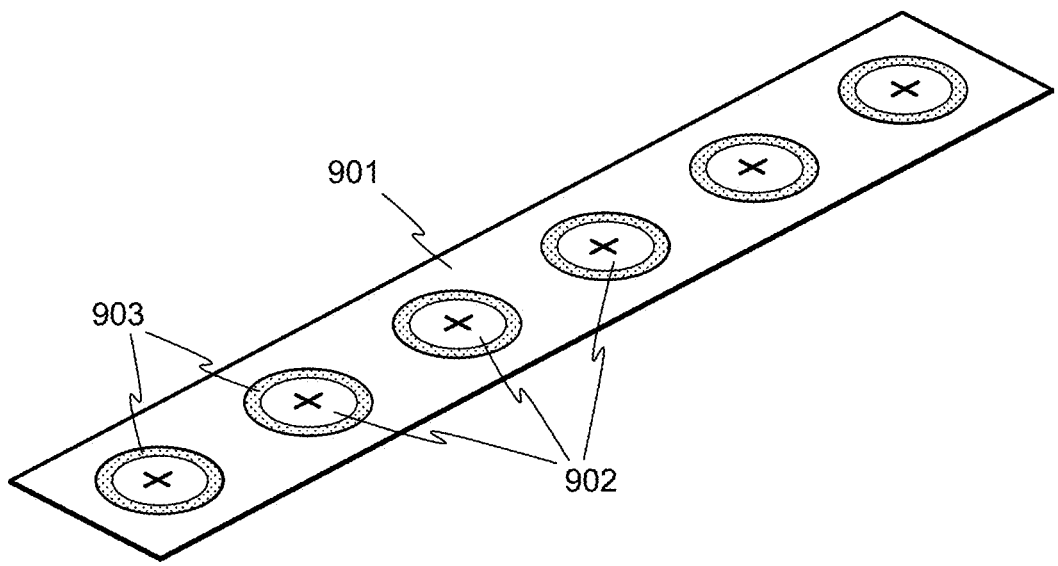
FIG. 9 illustrates a carrier in accordance with embodiments of the invention, including a number of sample loading areas.

FIG. 9 shows a carrier 901 in accordance with embodiments of the invention, including a number of sample loading areas 902. Carrier 901 may be, for example, a porous membrane made from PVDF, PTFE, nitrocellulose, or another suitable material. Border markings 903 may be printed around loading areas 902 to guide a user in where to place samples for testing. Carrier 901 may then be placed into a quantitation device such as device 100, and the different loading areas 902 may be sequentially moved into the optical path of the device for testing. The movement may be done manually by the user, or the device may include a motorized mechanism for moving carrier 901.

In some embodiments, border markings may serve other functions as well. For example, border markings 903 may be made hydrophobic, to prevent liquid samples placed in sample loading areas 902 from migrating out of the loading area. The interior of sample loading areas 902 could also be treated to be hydrophilic, to further assist in containing sample liquids. In other embodiments, annular regions of the membrane surrounding the sample loading areas may be compressed to prevent migration of the sample out of the sample loading areas.

Figure 10:
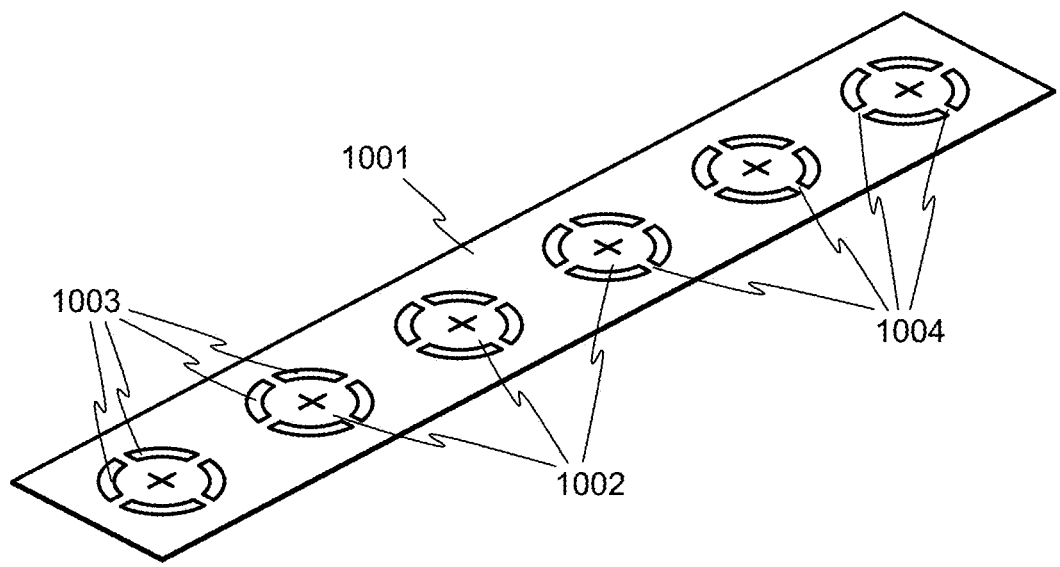
FIG. 10 shows a carrier in accordance with other embodiments of the invention, including a number of sample loading areas.

FIG. 10 shows a carrier 1001 in accordance with other embodiments of the invention, including a number of sample loading areas 1002. Carrier 1001 may also be, for example, a porous membrane made from PVDF, PTFE, nitrocellulose, or another suitable material. Openings 1003 are cut into carrier 1001, surrounding each of the sample loading areas 1002. Openings 1003 serve to substantially prevent liquid from the sample areas from migrating out of the sample areas. Bridges 1004 support sample loading areas 1002. Bridges 1004 are preferably narrow enough that any migration of liquid along them is inconsequential. In some embodiments, for example when carrier 1001 is made of a porous membrane, bridges 1004 may be treated with a solidifying substance such as an adhesive to block any migration of liquid along them. In some embodiments, the bridges may be compressed to block migration of liquid.

It will be recognized that single-sample carriers are possible, as are carriers having sample areas arranged differently than in FIGS. 9 and 10. For example, a disk-shaped carrier may include sample areas in a circular pattern, and the sample areas may be presented to the optical path of the quantitation device using a manual or automatic rotating mechanism. In other embodiments, a carrier may include a two-dimensional array of sample areas, or another arrangement.

According to another aspect, measures are taken to prepare the sample to be measured to provide for robust measurement.

Figure 11:
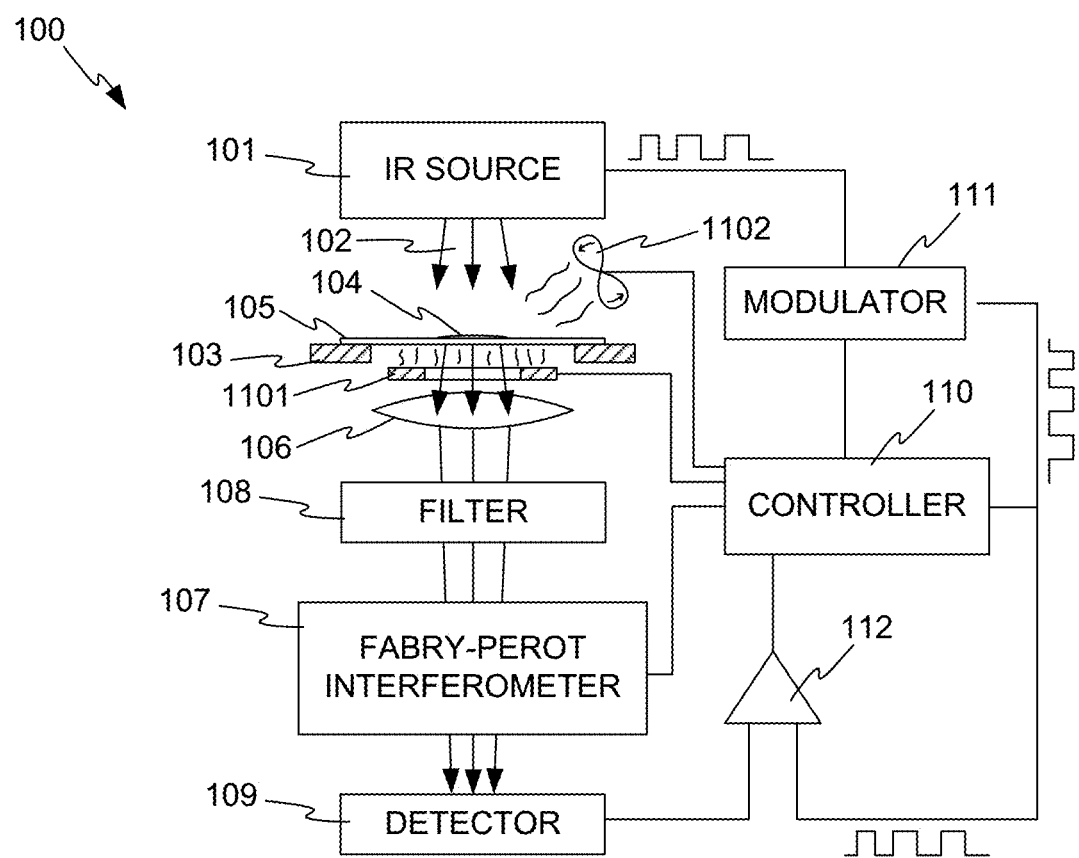
FIG. 11 illustrates the use of a heater or moving air source in an embodiment of the invention.

For example, water absorbs infrared radiation heavily, so any sample to be measured with a device embodying the invention must be thoroughly dried. In some embodiments, a quantitation device may include features for promoting the drying of a sample. For example, FIG. 11 illustrates the use of a heater 1101 or moving air source 1102 in an embodiment of the invention. Heater 1101 and air source 1102 are shown in the context of quantitation device 100, but such features may be present in any embodiment. Only one of heater 1101 or air source 1102 may be present, or both may be present. Heater 1101 may be a resistive heater placed near the sample holder, such as immediately over or under the sample, possibly surrounding the sample, so that heat may be temporarily applied to ensure full drying of the sample. Other kinds of heaters may be used. In other embodiments, a source of flowing air may be provided near the sample holder and aimed at the sample, to promote drying of the sample. Flowing air source 1102 may be a rotary or piezoelectric fan, or another kind of air source. Heat and moving air may be used individually or in combination. Preferably, any heater or air source can be switched on and off as needed, for example under the control of a controller such as controller 110.

Figure 12:
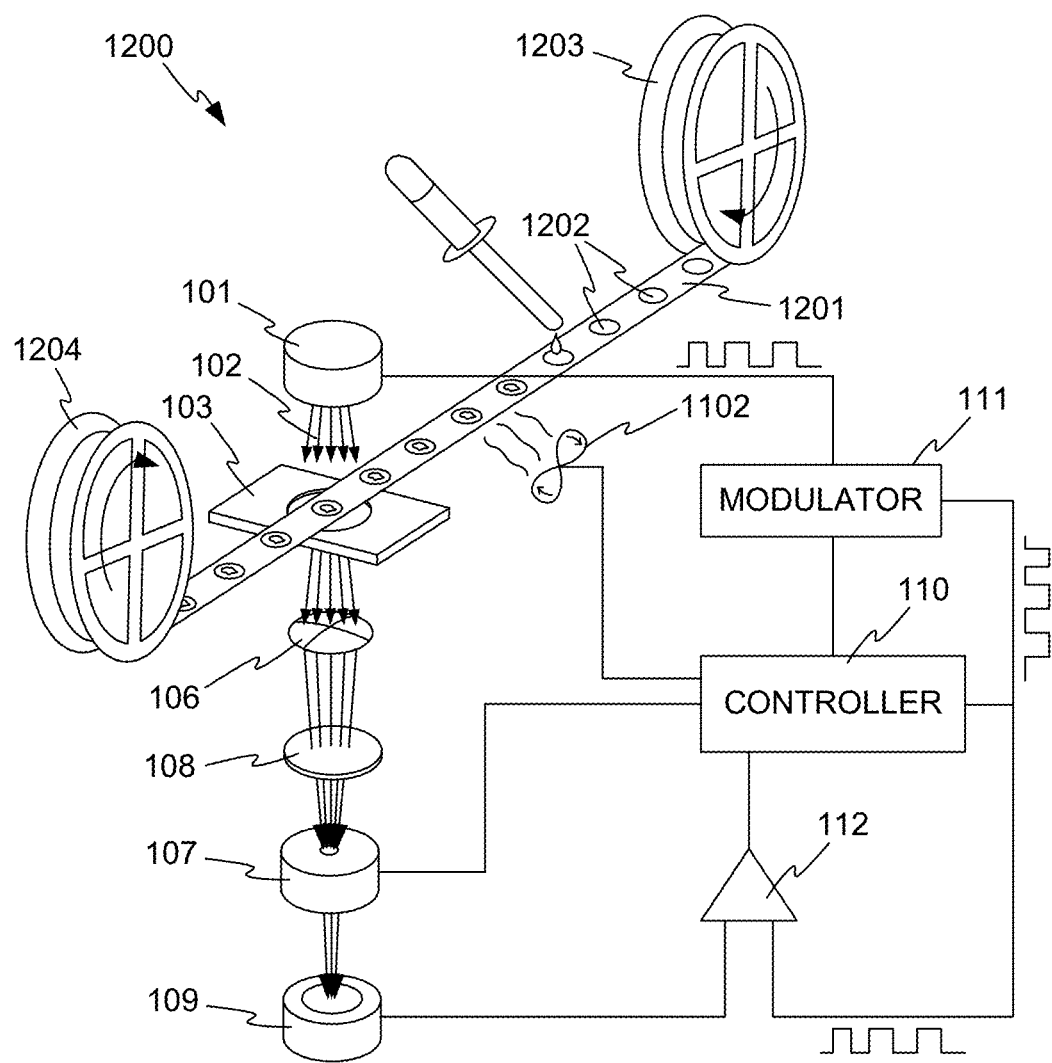
FIG. 12 illustrates a quantitation device in accordance with other embodiments of the invention.

FIG. 12 illustrates a quantitation device 1200 in accordance with other embodiments of the invention. Several elements of device 1200 are similar to elements of device 100, and are given the same reference numbers. Quantitation device 1200 includes an additional capability for presenting samples for analysis to the device. In device 1200, samples are deposited on a strip 1201 of carrier material, which may be similar to the material of carrier 105, 901, or 1001. Sample loading areas 1202 may be indicated on strip 1201, and may be isolated by bridges from the rest of strip 1201, similar to the isolation of sample loading areas 1002 on carrier 1001 described above. Strip 1201 is provided on a supply spool 1203, and is threaded across sample holder 103 to a take up spool 1204.

This arrangement allows for efficient usage of the device. Samples may be placed on strip 1201 and incrementally advanced toward sample holder 103. While one sample, is being characterized by Fabry-Perot interferometer 107, subsequent samples may be dried, for example by a moving air source 1102, a heating element (not shown), or other drying devices or combinations of devices. Supply and take up spools 1203 and 1204 may be motorized and controlled by controller 110, may be manually controlled, or may be controlled in some other way.

Other mechanisms for sequentially presenting samples for analysis may be used in other embodiments. For example, sample areas could be designated on a flat rotating disk, in a rectangular array, or in other arrangements.

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is optional and not excluded. The invention has now been described in detail for the purposes of clarity and understanding. However, those skilled in the art will appreciate that certain changes and modifications may be practiced within the scope of the appended claims.

What is claimed is:

1. A carrier for holding a sample for analysis, the carrier comprising:
   a porous membrane having a number of sample loading areas designated thereon, the porous membrane defining a plurality of openings extending through the membrane, wherein each of the sample loading areas is defined by at least some of the plurality of openings; wherein at least the sample areas are impregnated with a surfactant.

2. The carrier of claim 1, wherein the membrane comprises polyvinylidene difluoride, (PVDF), polytetrafluoroethylene (PTFE), or nitrocellulose.

3. The carrier of claim 1, wherein the membrane comprises a woven mesh.

4. The carrier of claim 1, wherein the sample loading area is hydrophobic.

5. The carrier of claim 1, wherein the sample loading area is hydrophilic.

6. The carrier of claim 1, wherein all of the carrier is impregnated with the surfactant.

7. The carrier of claim 1, wherein the surfactant at least one of: shifts an absorbance spectra of the sample area; increases specific absorbance; decreases specific absorbance; and creates a new absorbance.

8. The carrier of claim 1, wherein a bridge of the membrane extends between each adjacent pair of openings.

9. The carrier of claim 8, wherein each of the sample loading areas is joined to a remainder of the membrane via the bridges between each adjacent pair of openings defining the sample loading area.

10. The carrier of claim 8, wherein each of the bridges is configured to block migration of fluid through the bridge.

11. The carrier of claim 10, wherein the bridges are at least one of: compressed to block migration of fluid; and treated with a substance to block migration of fluid.

12. The carrier of claim 11, wherein the substance comprises at least one of: a solidifying substance; and an adhesive.

13. The carrier of claim 1, wherein the carrier is transparent to infrared light.

14. The carrier of claim 1, wherein the sample loading area is defined by at least one border marking.

15. The carrier of claim 14, wherein the at least one border marking is hydrophobic.

16. The carrier of claim 15, wherein the sample loading area is hydrophilic.

17. The carrier of claim 1, wherein the sample loading area is defined by a compressed annular region of the carrier.

18. The carrier of claim 17 wherein the compressed annular region of the carrier surrounds the sample loading area.

* * * * *